US012578218B2

(12) United States Patent
Garcia Izaguirre et al.

(10) Patent No.: US 12,578,218 B2
(45) Date of Patent: Mar. 17, 2026

(54) HOUSING FOR CAPACITIVE LIQUID LEVEL SENSOR

(71) Applicant: CEBI ELECTROMECHANICAL COMPONENTS SPAIN, S.A., Villatuerta (ES)

(72) Inventors: Javier Garcia Izaguirre, Villatuerta (ES); Sergio Diez Garcia, Villatuerta (ES)

(73) Assignee: CEBI ELECTROMECHANICAL COMPONENTS SPAIN, S.A., Villatuerta (ES)

( * ) Notice: Subject to any disclaimer, the term of this patent is extended or adjusted under 35 U.S.C. 154(b) by 286 days.

(21) Appl. No.: 18/260,997

(22) PCT Filed: Dec. 23, 2021

(86) PCT No.: PCT/ES2021/070929
§ 371 (c)(1),
(2) Date: Jul. 11, 2023

(87) PCT Pub. No.: WO2022/152955
PCT Pub. Date: Jul. 21, 2022

(65) Prior Publication Data
US 2024/0060809 A1     Feb. 22, 2024

(30) Foreign Application Priority Data
Jan. 14, 2021    (ES) ............................... ES202130045

(51) Int. Cl.
*G01F 23/263* (2022.01)
*G01D 11/24* (2006.01)
*G01F 23/26* (2022.01)

(52) U.S. Cl.
CPC ......... *G01F 23/268* (2013.01); *G01D 11/245* (2013.01); *G01F 23/26* (2013.01)

(58) Field of Classification Search
CPC .................. G01D 11/24; G01D 11/245; G01F 23/26–268
See application file for complete search history.

(56) References Cited

U.S. PATENT DOCUMENTS 9,297,686 B1 * 3/2016 Ross, Jr. ............... G01F 23/263
10,422,681 B2 * 9/2019 Rondano ............... G01F 23/266
(Continued)

FOREIGN PATENT DOCUMENTS

ES        1045514 U     9/2000
WO    2015181770 A2    12/2015
WO    2019016660 A1     1/2019

OTHER PUBLICATIONS

International Search Report for Corresponding International Application No. PCT/ES2021/070929, 3 pages, Feb. 22, 2022.

*Primary Examiner* — Justin N Olamit
(74) *Attorney, Agent, or Firm* — LUCAS & MERCANTI, LLP

(57) ABSTRACT

A housing for a capacitive liquid level sensor, for providing an insulating cover over the functional assembly (1) of a capacitive liquid level sensor, consisting of two independent half-bodies (2) and (3), which overlap one another and are secured with a perimeter joint (5) therebetween, the assembly of the half-bodies (2) and (3) determining an intermediate cavity (4) for accommodating the functional assembly (1) of the capacitive liquid level sensor of the application.

5 Claims, 3 Drawing Sheets

(56)         References Cited

U.S. PATENT DOCUMENTS

| | | | |
|---|---|---|---|
| 11,680,839 B2 * | 6/2023 | Yednak, III | ........... G01F 23/268 |
| | | | 73/304 C |
| 11,835,539 B2 * | 12/2023 | Satoh | ................... G01D 11/245 |
| 2019/0056321 A1 | 2/2019 | Pizzi et al. | |
| 2019/0128726 A1 | 5/2019 | Zorzetto | |
| 2019/0186978 A1 * | 6/2019 | Rondano | .............. G01F 23/265 |
| 2020/0240914 A1 | 7/2020 | Pizzi et al. | |

* cited by examiner

HOUSING FOR CAPACITIVE LIQUID LEVEL SENSOR

CROSS REFERENCE TO RELATED APPLICATION

This Application is a 371 of PCT/ES2021/070929, filed on Dec. 23, 2021, which claims the benefit of Spanish Patent Application No. U202130045, filed on Jan. 14, 2021, each of which are incorporated herein by reference.

TECHNICAL FIELD

The present invention relates to the field of liquid level measurement and particularly to liquid level measurement by means of capacitive sensors, proposing a housing for sensors of this type, developed according to an embodiment that provides advantageous constructive and functional characteristics.

STATE OF THE ART

Embodiments of capacitive level sensors formed by an electrode carrier plate in the form of parallel linear conductors or as a group of rectangular electrodes, with said plate being arranged on a flat insulating support, are known in the field of liquid level measurement.

However, to avoid corrosion processes of electrochemical origin, as well as possible electrical safety risks that may occur in the event that the level sensor is submerged in a liquid medium to be measured that is electrically conductive, the functional assembly, formed by the electrode carrier plate and its support, is enclosed by a layer of insulating material, in order to prevent the active electrical parts of the sensor from coming into contact with the liquid medium of application in level measurements.

In this sense, there are different proposals to ensure insulation between the functional assembly of the level sensors and the liquid medium to be measured, for example, the solution proposed by document WO2015181770, which consists of a separately molded or overmolded insulating casing, defining a cavity in which the functional assembly of the sensor is housed, with an insert of a vulcanizable elastomer or gel type material, between the mentioned functional assembly of the sensor and the insulating casing.

In this case, if an embodiment in which the insulating casing is molded separately by means of an injection process is chosen, the problem arises that, for the sensor to function correctly, the functional assembly must be in very close contact with the inside of the insulating outer casing, in order to minimize the distance between the electrodes of the functional assembly and the medium to be measured, without which the system lacks adequate sensitivity.

To achieve this quality, the functional assembly of the sensor must be arranged very snugly in the insulating outer casing, which results in a rectangular section of very little thickness which, in applications in which a large relative length is required, causes a very long cavity with a small distance between the larger walls, with this configuration being incompatible with the conicity (about 2°) that must be given to the corresponding core of the mold, in order to be able to achieve mold release. Furthermore, even in the case of applying draft angles, the core is very long and slim, being held only by one of the ends, so that it can easily break due to the pressure exerted by the injected plastic mass.

On the contrary, if there is a need to make a robust core, this leads to leaving a lot of space inside the insulating casing, with it being necessary to arrange additional parts that act by way of springs on the support of the electrode plate in order to achieve close contact of the functional assembly of the sensor with the inner face of the insulating casing.

On the other hand, if there is a need to make a core that is held at both ends, a plug part which closes the insulating casing at the end with the smallest section must be added, which increases cost and reduces reliability by adding a joint that will be in contact with the liquid to be measured with the sensor.

All of this rules out or complicates the use of an injection molding process to obtain the outer insulating casing of the sensor.

Document WO2019016660 proposes a solution based on a coating for the functional assembly of the sensor with a vulcanizable silicone layer, by means of an immersion process, subsequently incorporating a rigid outer casing by means of an overmolding process.

In this case, when considering an overmolded insulating casing, the problems are even greater, since there is a need to insert the entire functional assembly of the sensor inside the mold in which the overmolding operation is to be carried out, with there being the risk of damaging the electronics due to mechanical impacts or stresses, excessive temperatures, or static electricity discharges.

Furthermore, the materials that can be used to make the overmolded insulating layer must have, on one hand, a high surface tension, so that the liquid to be measured drains easily, in order to achieve quick drying of the sensitive surface when the liquid level drops, which is key for the proper operation of the sensor; and, on the other hand, said materials must have a high fluidity in the molten state, in order to fill the cavity of the insulating casing quickly and efficiently, when said cavity has a very small section.

In such a case, it happens that very fluid materials have a higher mechanical brittleness than that of less fluid materials, as well as a very different coefficient of expansion in relation to the support of the electrode plate of the functional assembly of the sensor whereby, when the overmolded material retracts, it remains stressed on the support of the electrode plate of the functional assembly, being able to initiate fractures in the corner areas or any other incident geometry that forms on the surface, such as support or ejector marks.

On the other hand, in order to form a continuous layer around the functional assembly, said functional assembly must be kept centered in the housing cavity, with it being necessary to use holding supports to keep it in place during the first phase of the injection process, which supports must be retracted at a time that must be calculated with great precision so that the discontinuities or tracks left by said holding supports are adequately filled, implying a very difficult and complicated process to perform in order to achieve a hermetic insulating layer with a continuous thickness that ensures contact between the fluid and the sensor over the entire surface thereof.

OBJECT OF THE INVENTION

The present invention proposes an outer insulating housing for capacitive liquid level sensors which is provided according to an embodiment that offers advantageous constructive and functional features with respect to conventional solutions for said function.

This housing object of the invention consists of two independent complementary half-bodies, made of an insulating material, which overlap one another other and are secured by means of a perimeter joint, leaving therebetween a cavity intended for housing the functional assembly of a capacitive liquid level sensor.

The perimeter joint between the component half-bodies of the casing can be established by any conventional means that allow obtaining a leak-tight securing, with the incorporation of a gasket if necessary, with a joint by means of a weld bead preferably being provided for this purpose by means of any known technique. An insulating housing that is very easy to make is thus obtained, since the component half-bodies can be manufactured separately by means of an injection process, to then join them together, without the need for inserts or cores to form a narrow housing cavity in which the assembly function of a capacitive liquid level sensor is in close contact with the wall of the insulating housing.

One of the component half-bodies of the housing is furthermore provided with a plate-like end base, provided with a groove to introduce therethrough the functional assembly of the capacitive level sensor to be housed inside the casing, said base being able to be complemented with other structural elements, so as to form a leak-tight casing over the segment of the functional assembly that remains on the outside external to the sensitive area that is submerged in the liquid to be measured with the sensor, which in turn allows the functional assembly of the level sensor to be readily assembled in the outer insulating housing.

On the other hand, the functional assembly of the level sensor can be incorporated, already provided with the necessary signal processing electronics, in the housing cavity between the component half-bodies of the outer insulating housing, before the half-bodies are joined together by being secured along the perimeter thereof, which also makes it possible to insert elastic elements that act by way of springs or compressors, to maintain a contact pressure between the functional assembly of the sensor and the wall of the outer insulating housing, in order to ensure close contact.

Based on the foregoing, the proposed housing presents structural features that are advantageous for the external insulation function of capacitive liquid level sensors for which it is intended, acquiring its own identity and a preferred character with respect to the conventional solutions that are currently used for said function.

DETAILED DESCRIPTION OF THE INVENTION

The object of the invention relates to a housing intended for accommodating the functional assembly (1) of a capacitive liquid level sensor, in order to maintain said functional assembly (1) in efficient insulation conditions, maintaining the effectiveness of the sensor for the function thereof in application for detecting liquid level.

The housing according to the invention consists of two independent half-bodies (2) and (3), complementary with one another, which can be coupled overlapping with one another, determining therebetween a cavity (4) for accommodating the functional assembly (1) or PCB of the capacitive sensor, where the functional assembly (1) can thus be assembled with ease so that it is fitted inside the cavity (4) of the housing, in close contact with the wall of the outer insulating housing over the entire surface thereof.

Closure to unify the housing is established by means of a perimeter joint (5) between the two half-bodies (2) and (3) once they are placed in an overlapping assembly, with said perimeter joint (5), for example, by means of a weld bead being determined by any known technique, such as hot plate, vibration, laser, etc., and generally by means of any conventional technique that allows establishing a leak-tight securing.

Figure 1:
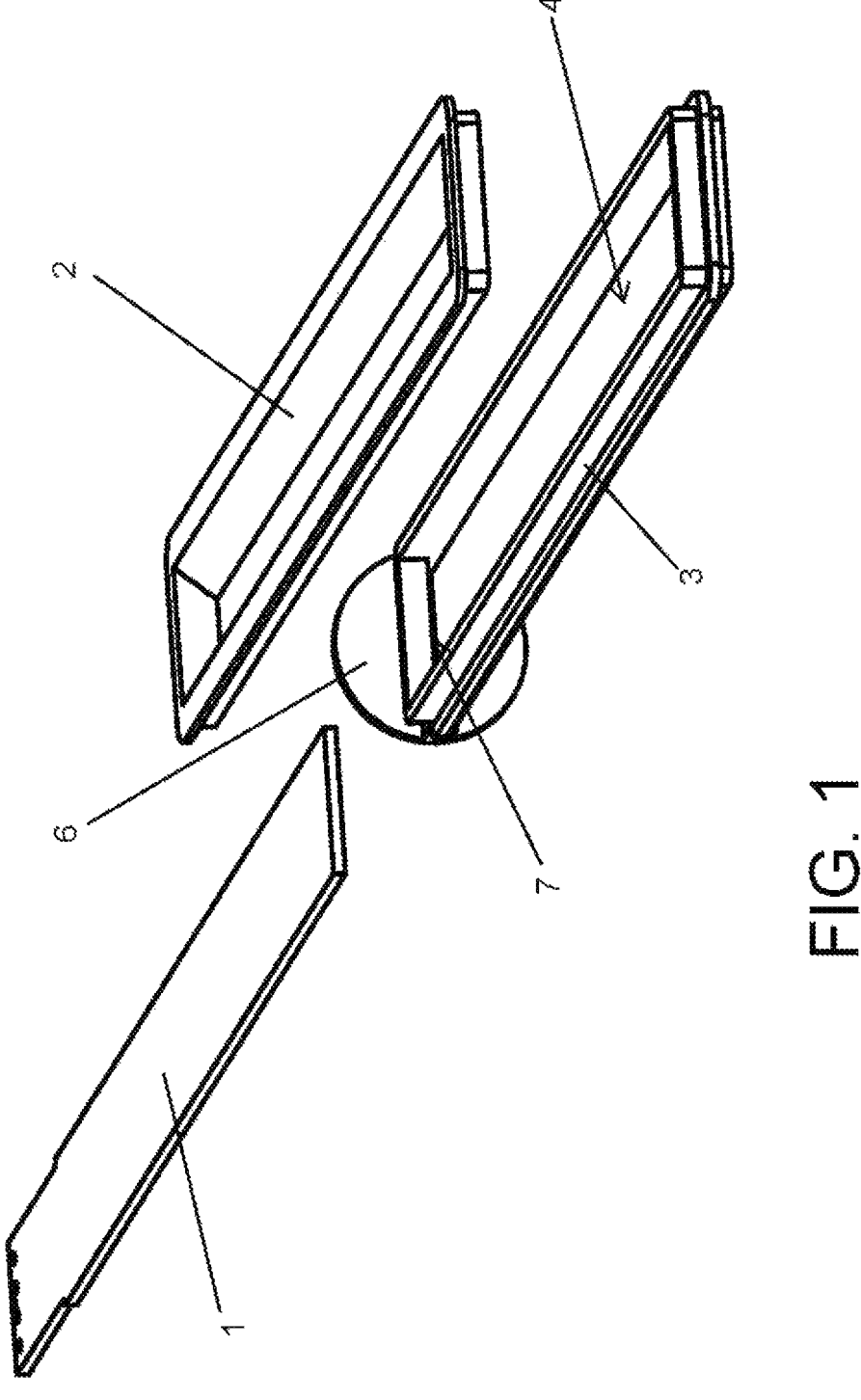
FIG. 1 shows a capacitive liquid level sensor according to the invention, with the component half-bodies of the outer insulating housing being separated in a correlative assembly position.
Figure 2:
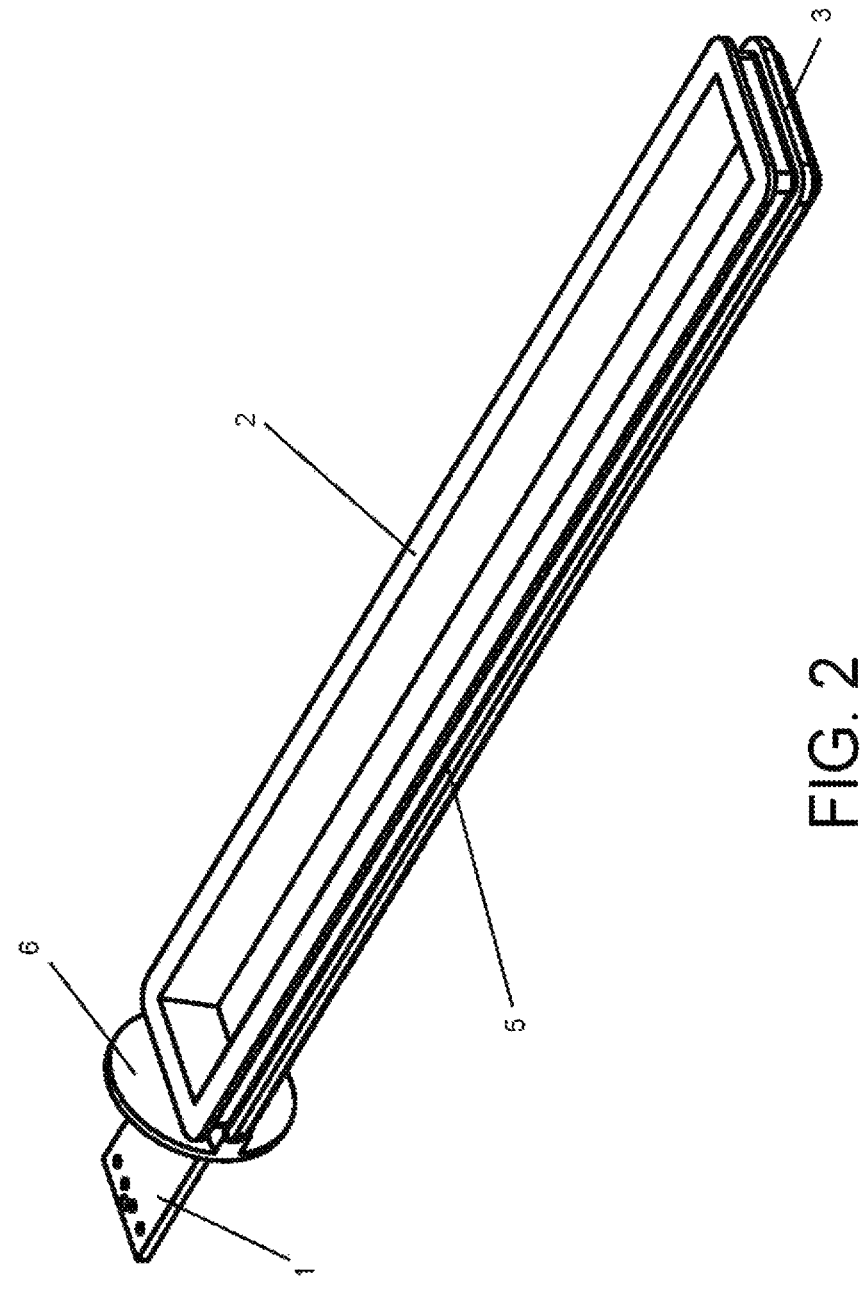
FIG. 2 is a perspective view of the capacitive liquid level sensor with the half-bodies of the outer insulating housing attached to one another.

According to a preferred embodiment, the structural formation of one of the component parts, for example, the half-body (3), is provided with a transverse plate-like structure (6) at one of the ends, said structure (6) having a through groove (7). As can be seen in the exploded view of FIG. 1, the functional assembly (1) can be introduced into the housing cavity (4) through said groove (7) into the housing such that the functional assembly (1) can be incorporated, during assembly, already provided with the electronics required for signal processing. According to a design option, said functional assembly (1) with elastic elements by way of springs can be incorporated in the housing cavity (4), before joining the half-bodies (2) and (3), so that said functional assembly (1) is pressed in most effective contact against the wall of the outer insulating housing. The assembled assembly would be as shown in FIG. 2, in which the half-body (2) is joined to the half-body (3) by pressing the functional assembly (1) and then joining both half-bodies (2, 3) accommodating therein the functional assembly (1) such that the latter maintains contact over its entire surface with both half-bodies (2, 3) and therefore ensures contact of the sensor with the fluid to be measured.

The plate-like structure (6) can be complemented on the outside with structural elements that cover the protruding part of the support of the functional assembly (1) that is accommodated in the cavity (4) inside the casing, in order to form in turn a leak-tight housing on that protruding part of the functional assembly (1) that is outside the sensitive area that is submerged in the liquid to be measured with the sensor.

Figure 3:
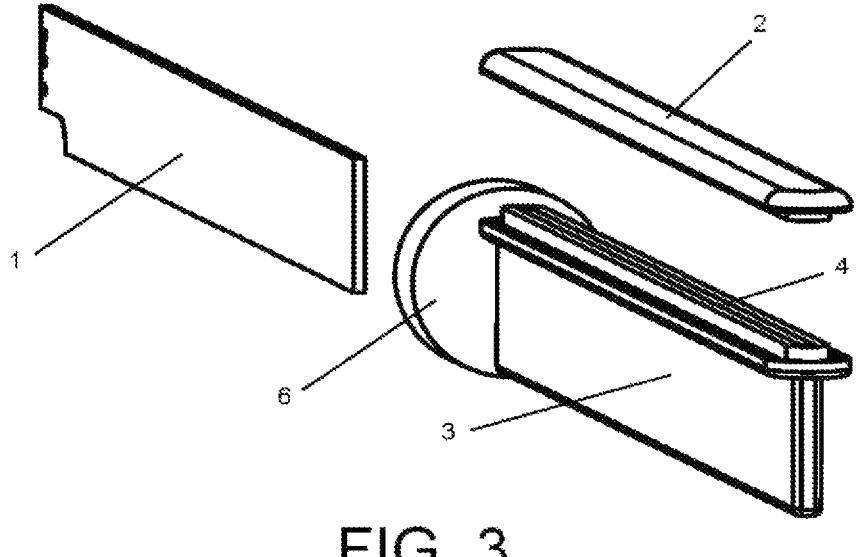
FIG. 3 shows a perspective view of another embodiment of a capacitive liquid level sensor according to the object of the invention, with the component half-bodies of the outer insulating housing being separated in a correlative assembly position.
Figure 4:
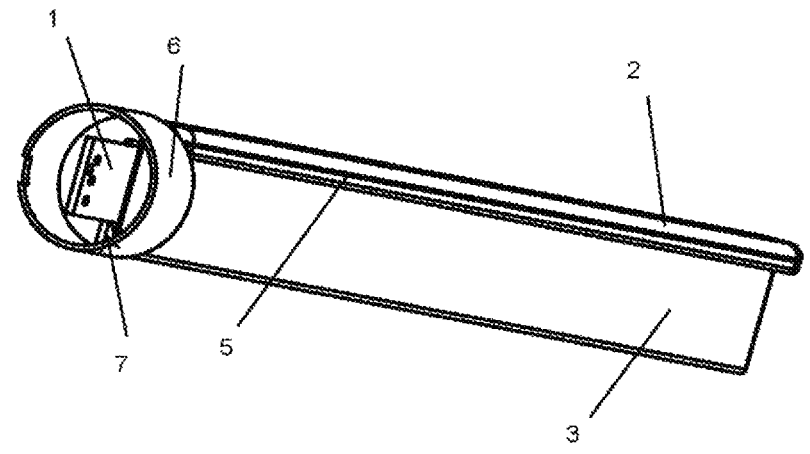
FIG. 4 is a perspective view of the capacitive sensor of the preceding figure with the half-bodies of the outer insulating housing joined to one another.

In an embodiment variant, the cavity (4) intended for accommodating the functional assembly (1) of the liquid level sensor can be formed in the half-body (3), also provided with the plate-like end structure (6), in an arrangement perpendicular to the joining plane between the half-bodies (2) and (3), as seen in FIGS. 3 and 4. This arrangement does not alter the concept of the invention, which is the formation of the insulating housing by means of two independent half-bodies (2) and (3), which are secured together in an overlapping manner by means of a leak-tight perimeter joint (5), determining therebetween a cavity (4) for accommodating the functional assembly (1) of a capacitive liquid level sensor.

In this case, as can be seen in FIGS. 3 and 4, the functional assembly (1) is likewise introduced through a groove (7) of the structure (6). In this case, it is envisaged for the half-body (3) to comprise a cavity (4) inside which the functional assembly (1) will be arranged in close contact with the walls of said cavity (4). Subsequently, the upper half-body (2) is incorporated like a cover, such that both half-bodies are joined, preferably by welding. For this purpose, it is foreseen for the lower half-body (3) to comprise a perimeter edge that will be used to carry out said welding.

In a design option, the functional assembly (1) already provided with signal processing electronics can be inserted prior to the welding of the half-bodies (2, 3), which makes it possible to also insert elastic elements that act by way of springs or compressors, helping to maintain the pressure between the sensitive face of the functional assembly (1) and the corresponding inner face of the cavity (4) of the housing half-body (3). This arrangement provides a contact that is close enough so as to have a good sensitivity, making the addition of filler compounds such as gels or elastomers vulcanizable at room temperature between the sensitive face of the functional assembly and the walls of the cavity (4) unnecessary.

The invention claimed is:

1. A capacitive liquid level sensor apparatus comprising:
   a housing comprising:
      a first independent half-body;
      a second independent half-body coupled to the first independent half-body, the second independent half-body comprising an end, the end having an opening, wherein a joint between the first and second independent half-bodies is sealed;
      an internal cavity defined between the first and second independent half bodies; and
      a capacitive liquid level sensor having a first portion and a second portion, wherein:
      the first portion of the capacitive liquid level sensor is disposed in the internal cavity of the housing, wherein the first portion comprises a first flat surface and a second flat surface opposite the first flat surface, wherein an entirety of the first flat surface is in contact with the first independent half-body, wherein an entirety of the second flat surface is in contact with the second independent half-body, wherein the first portion is held within the housing without any material between the first portion and the housing; and
      the second portion of the capacitive liquid level sensor protrudes through the opening in the end of the second independent half-body and is disposed external to the housing.

2. The capacitive liquid level sensor apparatus according to claim 1, further comprising a perimeter joint defined where a perimeter of the first independent half-body contacts the second independent half-body, wherein the perimeter joint is established by means of a leak-tight securing between the first and second half-bodies.

3. The capacitive liquid level sensor apparatus according to claim 1, wherein the second half-body comprises a transverse plate structure at the first end, wherein the opening comprises a groove disposed in the transverse plate structure, the groove adapted to receive the capacitive liquid level sensor.

4. The capacitive liquid level sensor apparatus according to claim 1, wherein:
   the second independent half-body comprises:
      a first wall having a first external surface and a first internal surface; and
      a second wall having a second external surface and a second internal surface, wherein the second internal surface faces the first internal surface and is separated from the first internal surface; and
      wherein the internal cavity is further defined between the first and second internal surfaces;
   the first independent half-body is coupled to the second independent half-body along a side of the second independent half-body that is adjacent to the end, the first independent half-body forming a third external wall along the side perpendicular to the first and second external walls.

5. A capacitive liquid level sensor apparatus formed by:
   coupling a first independent half-body to a second independent half-body, wherein the first independent half-body comprises a perimeter, wherein the second independent half-body comprises an end having an opening, wherein the first independent half-body contacts the second independent half-body along the perimeter, wherein an internal cavity between the first and second independent half-bodies is formed by the coupling;
   sealing a perimeter joint between the first and second independent half-bodies along the perimeter of the first independent half-body; and
   inserting, subsequent to the sealing, a first portion of a capacitive liquid level sensor through the opening in the end of the second independent half-body into the internal cavity;
   wherein after the first portion of the capacitive liquid level sensor is inserted into the internal cavity:
      the first portion of the capacitive liquid level sensor is disposed in the internal cavity, wherein the first portion comprises a first flat surface and a second flat surface opposite the first flat surface, wherein an entirety of the first flat surface is in contact with the first independent half-body, wherein an entirety of the second flat surface is in contact with the second independent half-body, wherein the first portion is held within the housing without any material between the first portion and the housing; and
      a second portion of the capacitive liquid level sensor protrudes through the opening in the end of the second independent half-body and is disposed external to the internal cavity between the first and second independent half-bodies.

* * * * *